(12) United States Patent
Kechely

(10) Patent No.: US 7,429,018 B1
(45) Date of Patent: Sep. 30, 2008

(54) VARIABLE FLUID INTAKE WITH RAMP AND INFLATABLE BAG

(75) Inventor: Roy Eric Kechely, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 22 days.

(21) Appl. No.: 11/259,976

(22) Filed: Oct. 26, 2005

(51) Int. Cl.
  *B64D 33/02* (2006.01)
  *B64C 1/40* (2006.01)
  *B64C 23/00* (2006.01)
  *F02B 27/00* (2006.01)
  *F02K 11/00* (2006.01)

(52) U.S. Cl. ............... 244/53 B; 244/1 N; 137/15.1
(58) Field of Classification Search ........... 244/53 B, 244/1 N; 137/15.1, 15.2; 60/226.1, 226.3, 60/262; 415/220, 185, 156, 178, 213, 214
See application file for complete search history.

(56) References Cited

U.S. PATENT DOCUMENTS

| | | | | |
|---|---|---|---|---|
| 2,934,288 A | * | 4/1960 | MacIntyre | .................. 244/203 |
| 2,960,281 A | * | 11/1960 | Jumelle et al. | ............ 244/23 R |
| 3,053,488 A | * | 9/1962 | Cox, Jr. | ....................... 244/130 |
| 3,119,581 A | * | 1/1964 | Trevaskis | ................... 244/53 B |
| 3,430,640 A | * | 3/1969 | Lennard | ..................... 137/15.1 |
| 3,605,672 A | * | 9/1971 | Strumbos | ..................... 114/166 |
| 4,155,221 A | * | 5/1979 | Dhoore et al. | ............. 60/226.1 |
| 4,826,106 A | * | 5/1989 | Anderson | ............... 244/117 R |
| 5,026,004 A | * | 6/1991 | Dobie et al. | .............. 244/53 B |
| 6,523,339 B2 | * | 2/2003 | Hubbard | .................... 60/226.1 |
| 2005/0274103 A1 | * | 12/2005 | Prasad et al. | ............... 60/226.1 |

\* cited by examiner

*Primary Examiner*—Michael J. Carone
*Assistant Examiner*—Joshua J Michener
(74) *Attorney, Agent, or Firm*—The Noblitt Group, PLLC

(57) ABSTRACT

Methods and apparatus for a fluid inlet according to various aspects of the present invention comprise a housing and a ramp at least partially within the housing. The housing and the ramp define a passage through which air may flow to the engine and a cavity on the opposite side of the ramp from the passage. The ramp is moveable within the housing to change the size of the passage and the cavity. The system further comprises a seal substantially disposed across the cavity.

17 Claims, 4 Drawing Sheets

VARIABLE FLUID INTAKE WITH RAMP AND INFLATABLE BAG

FIELD OF THE INVENTION

The invention relates to methods and apparatus for a fluid inlet.

BACKGROUND OF THE INVENTION

Some turbine engines require subsonic high-pressure airflow to operate. When an air-breathing aircraft travels at supersonic speeds, the airflow is typically slowed down before entering the engine of the aircraft. One method of reducing the airflow speed uses a mixed compression inlet which compresses supersonic airflow entering the front of the inlet and then re-expands the flow to a subsonic condition at the aft end of the inlet, certain supersonic low pressure flow at the forward of the inlet and subsonic high pressure flow at the aft of the inlet and at the front of the engine face.

SUMMARY OF THE INVENTION

Methods and apparatus for a fluid inlet according to various aspects of the present invention comprise a housing and a ramp at least partially within the housing. The housing and the ramp define a passage through which air may flow to the engine and a cavity on the opposite side of the ramp from the passage. The ramp is moveable within the housing to change the size of the passage and the cavity. The system further comprises a seal substantially disposed across the cavity.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional components and various assembly and/or operating steps. Such functional components may be realized by any number of systems and devices configured to perform the specified functions and achieve the various results. For example, the present invention may employ various intakes, housings, ramps, seals, elements, machines, systems, materials, and devices which may carry out a variety of functions. In addition, the present invention may be practiced in conjunction with any number of fluid flow applications, systems, and devices, and the systems described is merely one exemplary application for the invention. Further, the present invention may employ any number of conventional techniques for manufacturing, assembling, connecting, operating, and the like.

Figure 1:
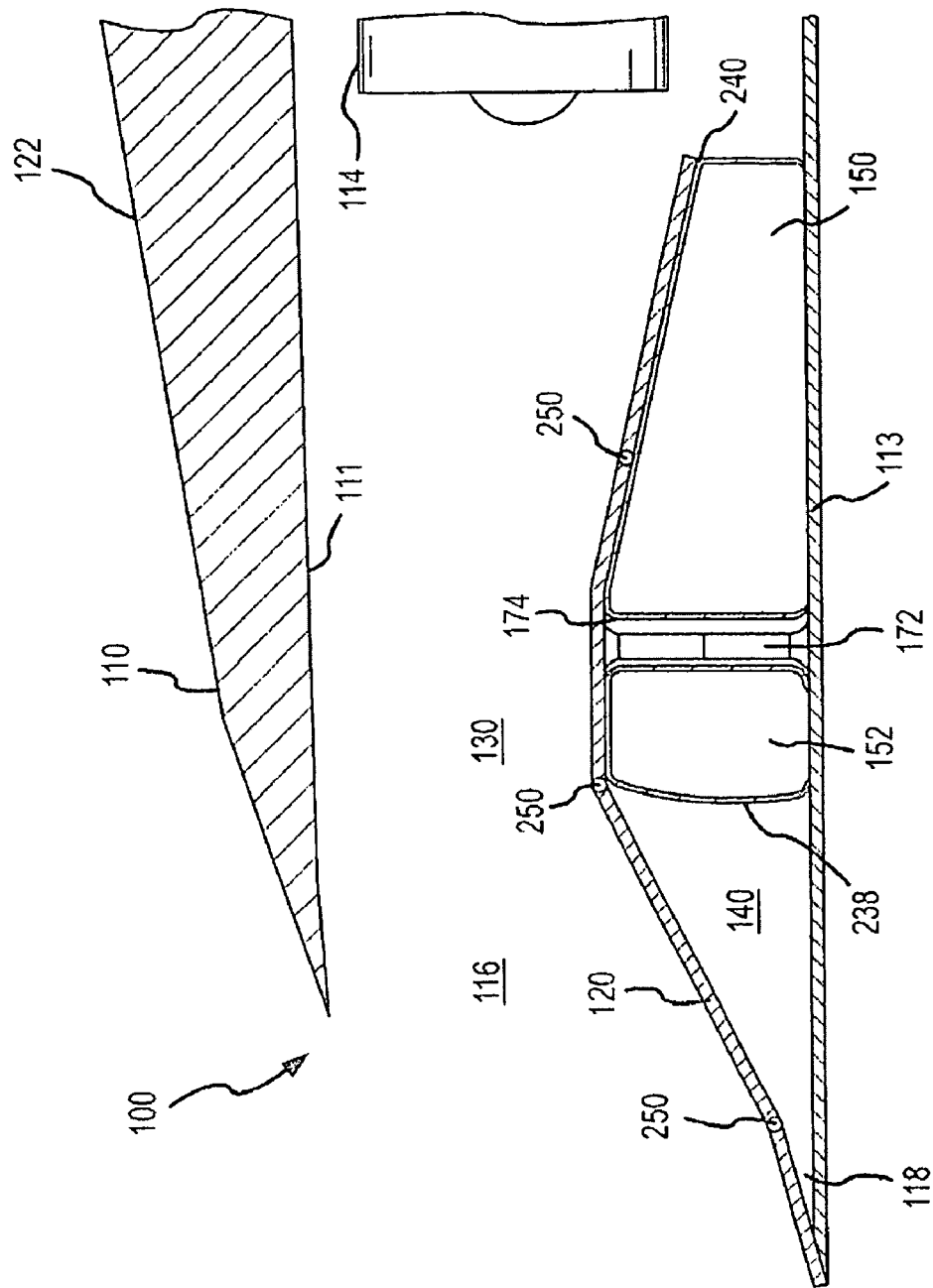
FIGS. 1 and 2 are side cross-sectional views of an inlet according to an exemplary embodiment of the present invention.
Figure 2:
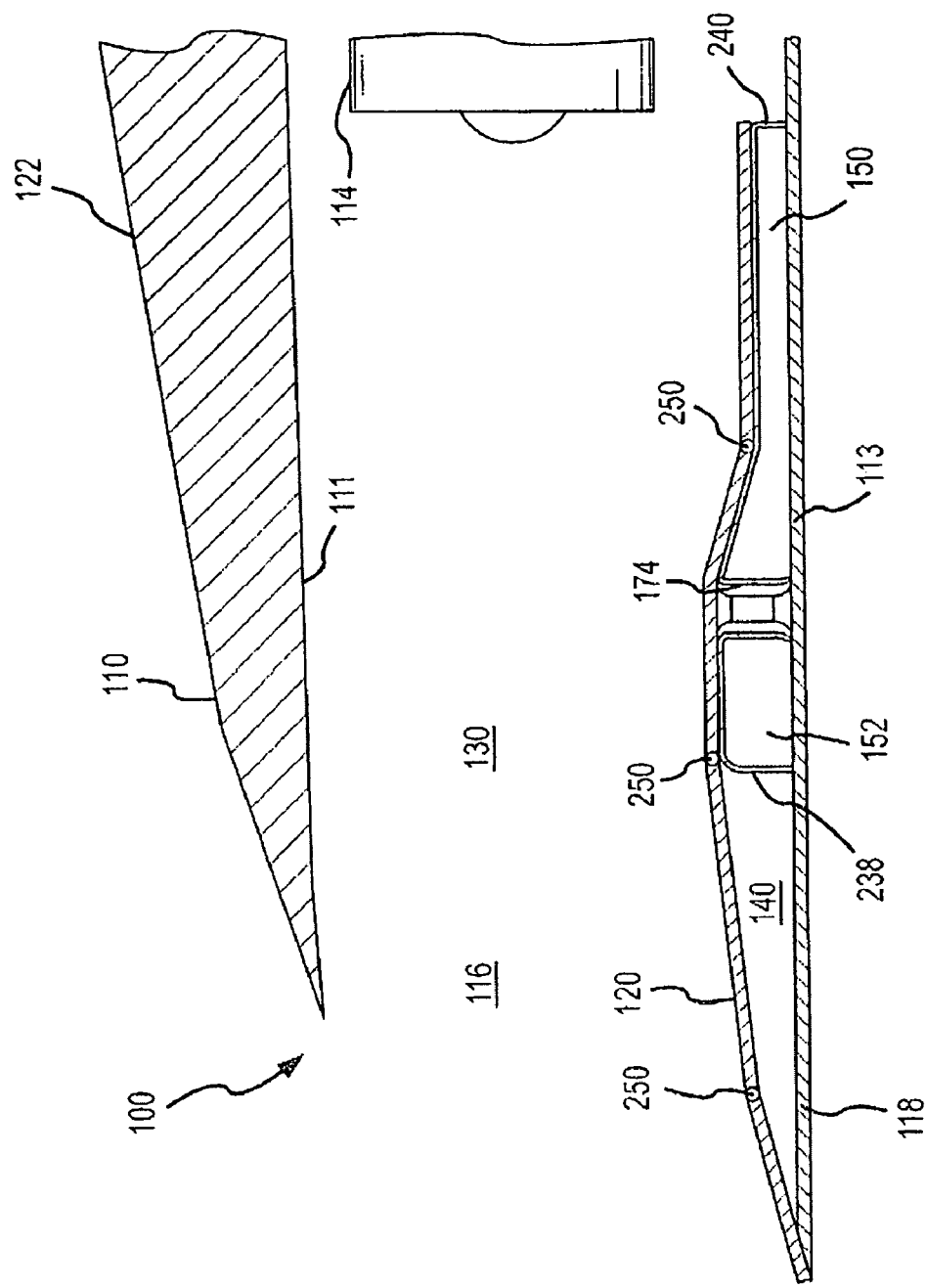

Referring now to FIGS. 1 and 2, an inlet 100 according to various aspects of the present invention, such as a mixed compression supersonic air inlet for an aircraft engine, comprises a housing 110, a ramp 120, and a seal 150. The housing 110 and the ramp 120 define a passage 130 above the ramp 120 and a cavity 140 beneath the ramp 120. The passage 130 defines an airflow path from a forward end 118 of the housing 110 to an engine 114 as an aft end 122 of the passage 130. The seal 150 is disposed within the cavity 140 to inhibit airflow through the cavity 140.

The housing 110 defines the airflow path 116 to provide air to the engine 114. The housing 110 may include any suitable configuration, structures, systems, and materials to define at least a portion of the airflow path 116. In the present embodiment, the housing 110 is configured to convert a low-pressure, high-speed airflow through an opening at the forward end 118 of the airflow path 116 to a high-pressure, low-speed airflow at the aft end 122. In an exemplary embodiment, referring to FIGS. 3 and 4, the housing 110 defines an inlet having a substantially rectangular or square cross-section across the airflow path 116. The housing 110 includes a floor 113, a top wall 111, and two sidewalls 112, and may be of any suitable size and shape.

The ramp 120 moves within the housing 110 to change the configuration of the airflow path 116. The ramp 120 may comprise any appropriate system or configuration to change the airflow path, such as a movable surface in the airflow path. In the present embodiment, the ramp 120 moves substantially perpendicularly with respect to the airflow path 116 to vary the size and shape of the passage 130. The movement of the ramp 120 may be controlled to maintain the terminal shock position, or the point at which the air flowing into the inlet 100 becomes subsonic, in the inlet 100 as the speed of the aircraft varies.

The ramp 120 may be implemented using any suitable systems, structures, and materials. For example, the ramp 120 may be configured with one or more curved surfaces for a round inlet 100 or with other structures to affect the airflow. In the present embodiment, for example, the ramp 120 comprises a rigid material for use in aerospace applications, such as a titanium alloy, and is movably disposed between the sidewalls 112, such as using bearings between the ramp 120 and the sidewalls 112. The ramp 120 movement may be controlled in any suitable manner, such as one or more actuators 172. The ramp 120 may be of any suitable size and shape, such as comprising an adjustable surface to optimize the aerodynamic characteristics of the inlet 100. Referring to FIGS. 1 and 2, the ramp 120 may comprise multiple sections joined by ramp hinges 250 that allow the ramp 120 to move flexibly to alter the size and/or shape of the passage 130. The hinges facilitate the movement of the ramp 120 sections, and may also be configured to bleed air from the passage 130 above the ramp 120 to a controlled pressure under the ramp 120, such as in the forward low pressure area under the ramp 120. The forward end of the ramp 120 is fixed to the floor 113, and the aft end may be fixed or may move, such as along the sidewalls 112 with respect to the floor 113.

The seal 150 inhibits airflow through the cavity 140, separates the high and low pressure regions, and/or seals the region under the ramp 120 from the airflow in the passage 130. The seal 150 may comprises any suitable system, structure, and device in any suitable configuration to inhibit airflow through the cavity 140. For example, the seal 150 may comprise a flexible material disposed across an opening to the cavity 140, such as the opening defined by the sidewalls 112, the floor 113, and the aft end of the ramp 120.

In the present embodiment, the seal 150 comprises an airbag 152 disposed between the housing 110 and the ramp 120 and extending into the cavity 140. For example, the airbag 152 may comprise an enclosure 238 having an opening 240. The opening 240 is exposed to the high pressure area in front of the engine 114. The enclosure 238 extends under the ramp 120 into the cavity 140.

The airbag opening 240 may be configured in any suitable manner to allow air to enter and exit the airbag 152. The airbag opening 240 may also be configured to accommodate complex rotational and translational motion at the aft end of the inlet 100. In the present embodiment, the opening 240 is configured to remain open in operation so that the airbag 152 can inflate. For example, the aft end of the ramp 120 is attached to a part of the edge defining the opening 240 so that the upward movement of the ramp 120, such as in response to an increase in airspeed of the aircraft, widens the opening 240, facilitating airbag 152 inflation. Other portions of the opening 240 may also be attached to the floor 113 and sidewalls 112, for example using fasteners like adhesives and/or rail and screw systems. In the present embodiment, the edge defining the opening 240 is attached to the sidewalls 112 and floor 113 near the aft end of the ramp 120. A portion of the edge between a part attached to the sidewall 112 and a part attached to the ramp 120 may not be attached to either the ramp 120 or the sidewall 112, providing slack to accommodate movement of the ramp 120. Alternatively, at least a portion of the edge of the opening 240 may comprise an elastic material or may be otherwise configured to allow the opening 240 to vary in size.

The airbag enclosure 238 may comprise any suitable materials and configuration. For example, the airbag may comprise a plastic material, such as a nylon fabric, capable of moving flexibly as the cavity 140 deforms in response to movement of structures of the inlet 100, such as movement of the ramp 120 and deflection of the sidewalls 112 due to thermal expansion and pressure differentials. The airbag 152 may be configured to move, expand, and/or contract in any direction. In the present embodiment, the airbag enclosure 238 is attached to the floor 113, and may be attached to the sidewalls 112 and ramp 120 at various attach points, for example to keep the airbag 152 open while deflated. Additionally, the airbag 152 may be of any desired thickness to achieve any purpose, such as to accommodate temperature and pressure conditions.

Air may flow into the airbag 152 through the opening until the airbag 152 or the cavity 140, whichever is smaller, is filled. The airbag 152 impedes airflow through the cavity 140 to the forward end of the cavity 140. In addition, the pressurized air in the air bag 152 tends to support the bottom side of the ramp 120 and equalize the forces on the top and bottom of the ramp 120. In one embodiment, the forward end of the airbag 152 may be fixed with respect to a high load region above the ramp 120, which tends to reduce the actuation force necessary to move the ramp 120. Additionally, the airbag 152 may be shaped and/or positioned such that the location of the high pressure air under the ramp 120 is optimized to reduce the overall structural requirements of the structures in the inlet 100, such as the ramp 120 and the sidewalls 112. For example, the shape and/or position of the airbag 152 may be configured to substantially conform to the shape of the sidewalls to allow the stiffness of the sidewalls 112 to be reduced while still inhibiting high pressure air from the aft of the inlet 100 from escaping to the front of the inlet 100.

The inlet 100 may also includes a control system for controlling the operation of the ramp 120 and the airbag 152. The control system may include any appropriate elements and perform any suitable functions, such as actuators, mechanical connections, seals, movers, and the like. Referring to FIGS. 1 and 2, in the present embodiment, the control system includes at least one actuator 172 configured to control the movement of the ramp 120. The actuator 172 may comprise any suitable system for controlling the movement of the ramp 120, such as a hydraulic mover between the floor and the ramp 120.

The airbag 152 may be configured to accommodate the actuator 172. For example, gasketed cutouts may be formed in the airbag, such as at attach points to the ramp 120 and/or floor 113, and to allow for the passage of any ducting, electronic equipment, actuators, or mechanism attachments. The gasketed cutouts may comprise openings in the airbag 152 to accommodate passage of various items. The opening may be sealed to avoid releasing the pressure in the airbag 152, for example using a gasket that seals the edge around the objects passing through the airbag 152. The ends of the conduit may also serve as attach points to attach the airbag 152 to other structures, such as the ramp 120 and the floor 113.

In one embodiment, the airbag 152 may includes a conduit 174 extending from the floor 113 to the ramp 120 through which the actuator 172 passes. In the present embodiment, the conduit 174 is formed through the airbag 152 such that the airbag 152 surrounds the conduit 174. The conduit 174 may also tend to secure the airbag 152 in position for operation and/or serve as an attach point between the airbag 152 and other structures, such as the ramp 120 and the housing 110. The conduit 174 may be of any suitable size and shape.

Figure 3:
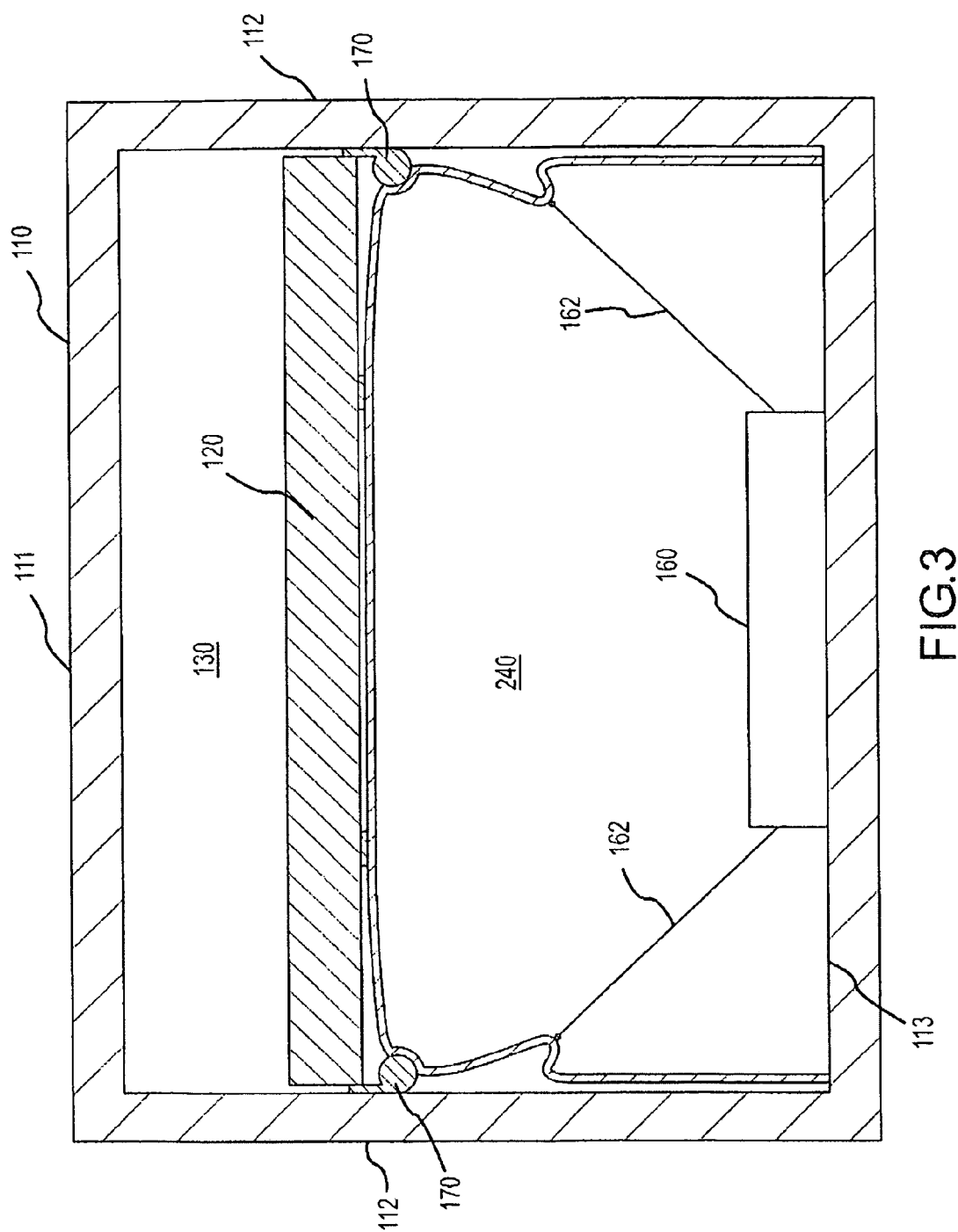
FIGS. 3 and 4 are rear cross-sectional views of the inlet.
Figure 4:
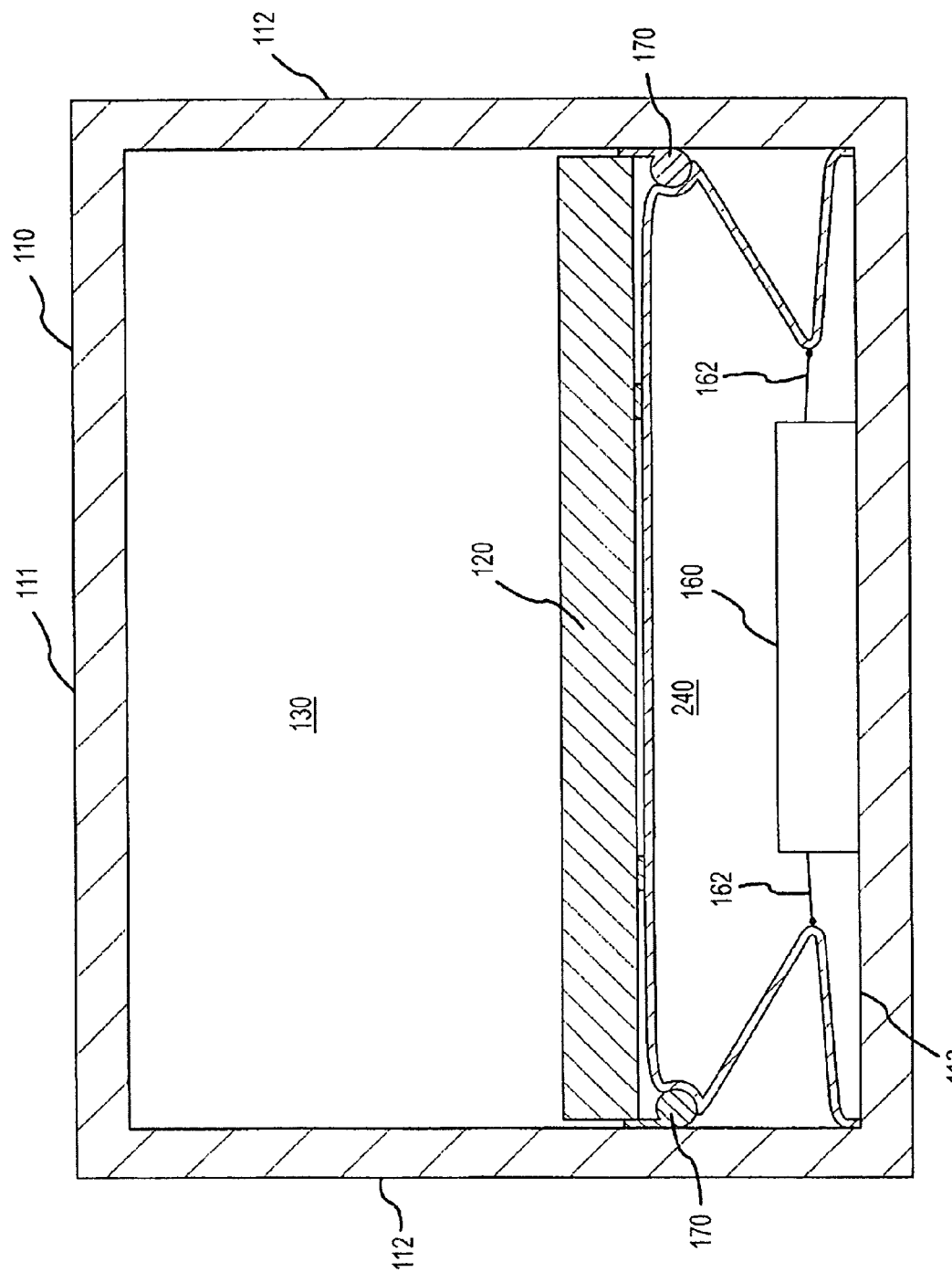

Referring to FIGS. 3 and 4, the control system may also include an airbag guide system 160 to control the movement of the airbag 152. The guide system 160 may comprise any suitable systems for adjusting the airbag 152, such as one or more cables 162 attached to the airbag 152, such as the interior surface of the airbag 152. The cables 162 may be withdrawn to draw the airbag 152 into a collapsed position as the airbag 152 deflates. The guide system 160 may be configured for any other purpose, such to allow the airbag 152 to expand and collapse with the movement of the ramp 120 and inhibit binding of the airbag 152 between the ramp 120, housing 110 and other structures as it inflates and deflates. In another embodiment, the guide system 160 comprises a mechanism attached directly to the ramp 120, for example, through the conduit 174, to manipulate the positioning of the airbag 152. The guide system 160 may be disposed in any suitable location, such as inside the airbag 152 or forward of the airbag 152.

Additionally, the control system may also include any other appropriate elements to control the operation of the airbag 152. For example, the control system may include one or more airbag bumpers 170 between the ramp 120 and the sidewalls 112. The airbag bumper 170 may separate the airbag 152 from the sidewall 112 as the ramp 120 moves toward the floor 113. In the present embodiment, the airbag bumper 170 pushes the airbag 152 down when the ramp 120 travels down, and supports the airbag 152 at the interface of the ramp 120 and housing sidewalls 112 to keep the airbag 152 from becoming entangled between the sidewalls 112 and the ramp 120.

In operation, the ramp 120 starts in a down position and the airbag 152 is in an collapsed position. As the aircraft speed increases, the ramp 120 may be elevated to a raised position to form a high-pressure, low-speed airflow at the engine face. The high pressure air at the engine face flows into the airbag 152, and the control system allows the airbag 152 to inflate under the ramp 120 and against the sidewalls 112. The airbag 152 inhibits air from leaking through the ramp 120 and into the passage 130, even if the floor 113, sidewalls 112, and ramp 120 deform. The high pressure in the airbag 152 also tends to counter the force on the top side of the ramp 120 to support the ramp 120 and reduce the deflection of the ramp 120.

When the aircraft slows, the ramp 120 drops to the down position. As the ramp 120 drops, the control system controls the collapse of the airbag, for example by withdrawing the cables. In addition, the airbag bumpers 170 move the sides of the airbag 152 away from the sidewalls 112 to avoid interfering with the descending ramp 120. As the engine slows and the ramp 120 drops, the pressure at the engine face decreases, allowing the airbag 152 to collapse and the ramp 120 to descend.

The particular implementations shown and described are illustrative of the invention and its best mode and are not intended to otherwise limit the scope of the present invention in any way. Indeed, for the sake of brevity, conventional signal processing, data transmission, and other functional aspects of the systems may not be described in detail. Furthermore, the connecting lines shown in the various figures are intended to represent exemplary functional relationships and/or physical couplings between the various elements. Many alterative or additional functional relationships or physical connections may be present in a practical system.

In the foregoing description, the invention has been described with reference to specific exemplary embodiments; however, various modifications and changes may be made without departing from the scope of the present invention. The description and figures are to be regarded in an illustrative manner, rather than a restrictive one and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. An intake system for an engine, comprising:
a housing;
a ramp disposed within the housing, wherein:
   the housing and the ramp define:
      a passage through which air may flow to the engine; and
      a cavity on the opposite side of the ramp from the passage; and the ramp is moveable within the housing to change the size of the passage and the cavity; and a seal substantially disposed across the cavity, wherein the seal comprises a flexible bag disposed within the cavity; wherein the bag comprises an edge defining an opening; the ramp comprises an aft end; the aft end of the ramp and the housing define an opening to the cavity; and the bag edge is attached to the aft end of the ramp and the housing.

2. The intake system according to claim 1, wherein the bag is configured to inflate and engage the ramp.

3. The intake system according to claim 2, wherein the bag is positioned under the ramp to counter a force on top of ramp.

4. The intake system according to claim 1, further comprising a guide system connected to the bag to control an expansion and a collapse of the bag.

5. The intake system according to claim 1, wherein:
the ramp and the hosing define a low pressure area in the cavity; and
the seal inhibits air from entering the low pressure area.

6. The intake system according to claim 1, further comprising a guide system connected to the seal and configured to control the disposition of the seal within the cavity.

7. The intake system according to claim 1, wherein the ramp comprises at least one hinge configured to allow low pressure air to enter a low pressure area defined by the ramp and the housing.

8. An intake system for an engine, comprising:
a housing, comprising:
   a forward end defining an opening;
   at least one interior surface defining a hollow interior; and
   an aft end adjacent the engine;
a flexible ramp disposed within the hollow interior the housing, comprising:
   a forward end pivotably connected to the at least one interior surface; and
   an aft end proximate the aft end of the housing;
   wherein the housing and the ramp define:
      a passage through the hollow interior to the engine; and
      a cavity in the hollow interior and on an opposite side of the ramp from the passage, wherein the cavity has an opening defined therein by the aft end of the ramp and the at least one interior surface; and
      wherein the ramp is configured to move to substantially perpendicularly to the direction of airflow through the passage to change the size of the passage; and
an airbag, comprising:
   a flexible enclosure disposed within the cavity between the ramp and the housing; and
   an edge defining an opening in the airbag, wherein the edge is attached to the aft end of the ramp and the at least one interior surface around the cavity opening.

9. An intake system according to claim 8, wherein the airbag is configured to inflate by receiving air through the airbag opening and deflate by expelling air through the airbag opening.

10. An intake system according to claim 8, further comprising an airbag guide mechanism connected to the airbag and configured to draw the airbag into a collapsed position as the airbag deflates.

11. An intake system according to claim 8, wherein:
   the ramp and the housing define a low pressure area in the cavity; and
   the airbag inhibits air from entering the low pressure area from the aft area of the housing.

12. An intake system according to claim 11, wherein the ramp comprises at least one hinge configured to allow low pressure air to enter the low pressure area.

13. An intake system according to claim 8, wherein the airbag is configured to inflate and engage the ramp.

14. An intake system according to claim 8, wherein the airbag is positioned under the ramp to counter a force on top of ramp.

15. A method for controlling an intake system for an engine, comprising:

moving a ramp within a housing to change the shape of a passage through which air may flow to the engine, wherein the ramp and the housing define the passage and a cavity;

exposing a bag opening of a bag displayed in the cavity and between the housing and the ramp to a high air pressure, wherein the bag forms a seal between the high air pressure and at least a portion of the cavity; wherein: the ramp comprises an aft end; the aft end of the ramp and the housing define an opening to the cavity; and a bag edge defining the bag opening is attached to the aft end of the ramp and the housing.

16. The method for controlling an intake system according to claim 15, further comprising guiding a movement of the bag.

17. The method for controlling an intake system according to claim 15, further comprising engaging the ramp with the bag.

* * * * *